(No Model.) 5 Sheets—Sheet 3.
W. W. DOOLITTLE.
MOLDING MACHINE.
No. 505,511. Patented Sept. 26, 1893.
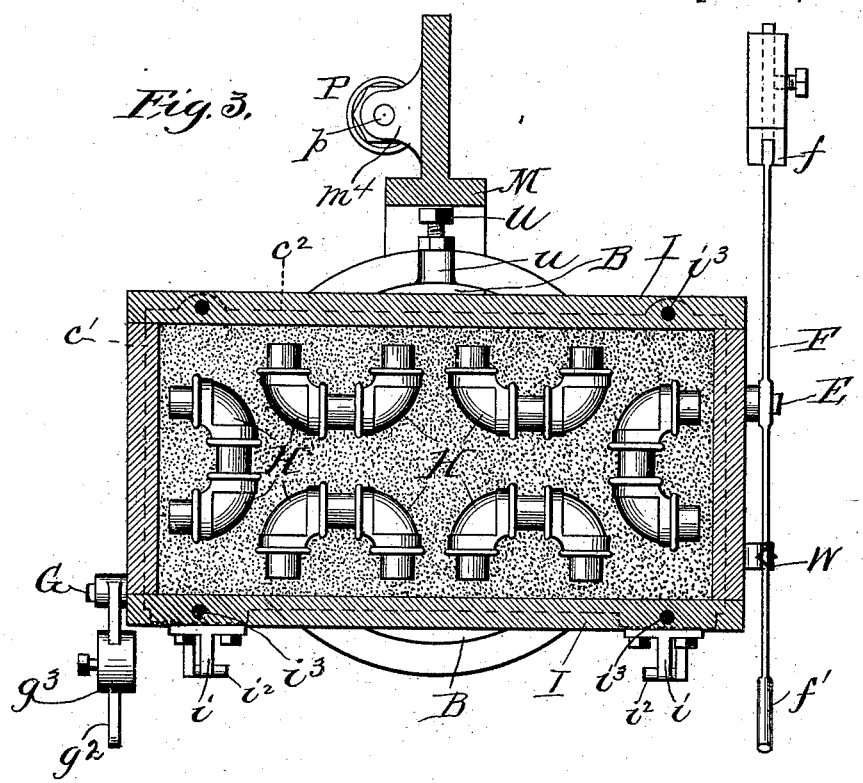
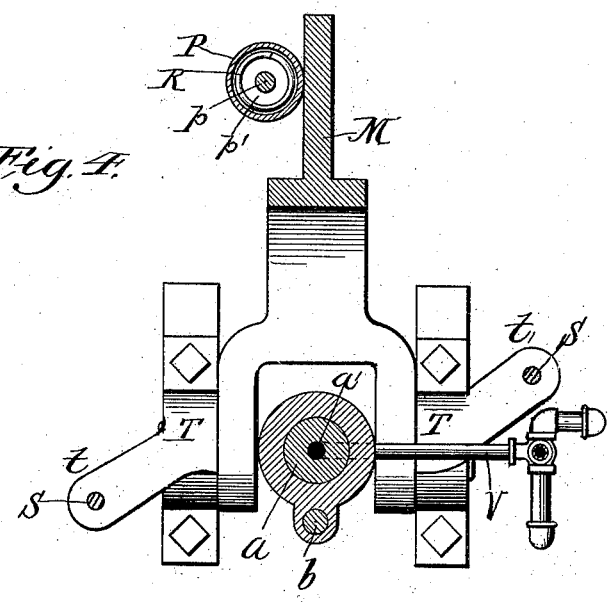
Witnesses
Martin H. Olsen
W. C. Coolies
Inventor
William W. Doolittle
by Johns & Thacher
Attys (No Model.) 5 Sheets—Sheet 4.
W. W. DOOLITTLE.
MOLDING MACHINE.
No. 505,511. Patented Sept. 26, 1893.
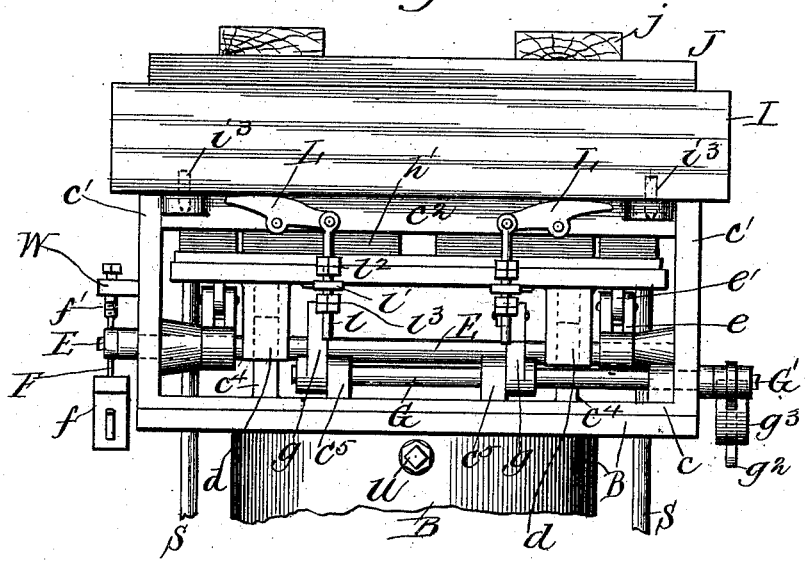
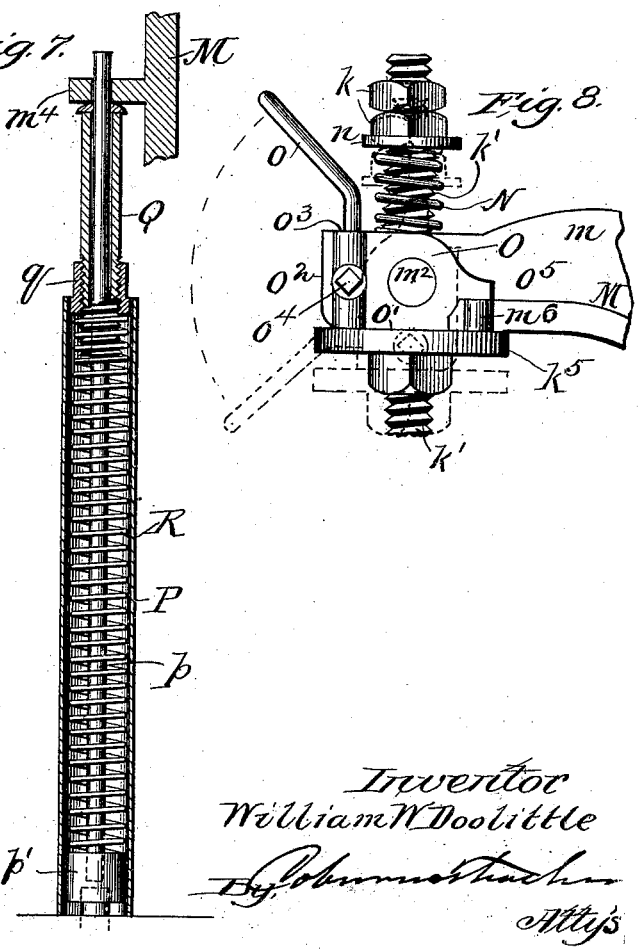
Witnesses
Martin H. Olsen.
W. C. Coiles
Inventor
William W. Doolittle
By Johnson Thacher
Attys (No Model.)　　　　W. W. DOOLITTLE.　　　5 Sheets—Sheet 5.
MOLDING MACHINE.
No. 505,511.　　　　　　　Patented Sept. 26, 1893.
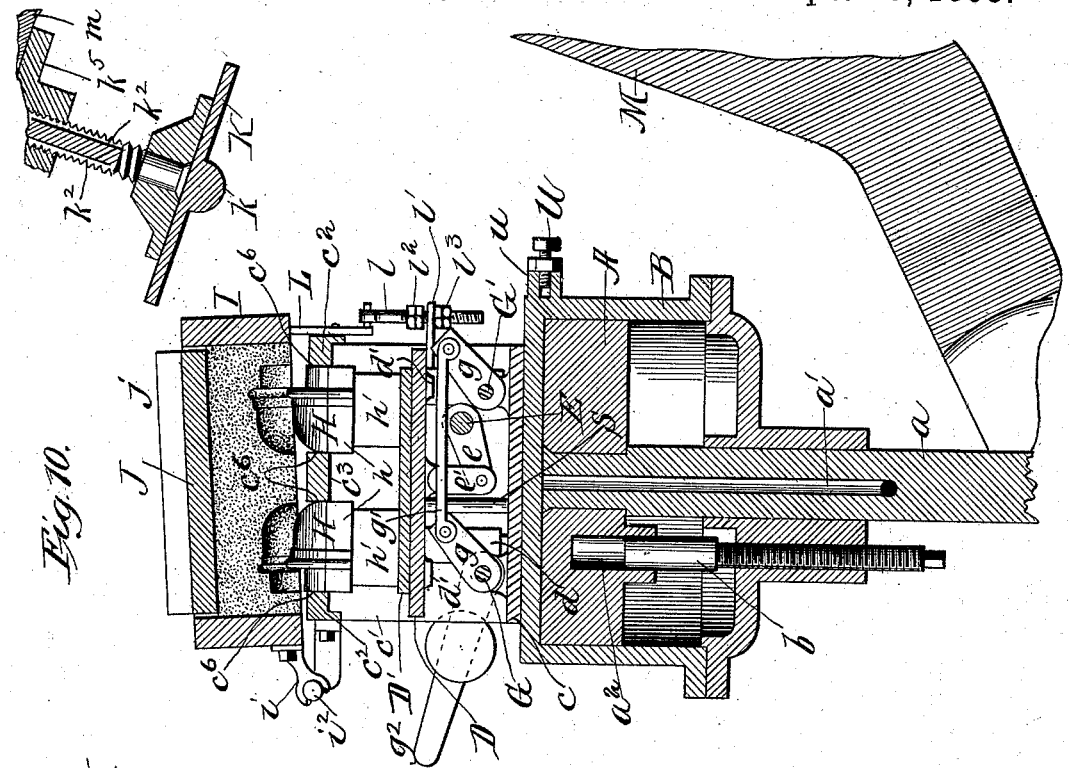
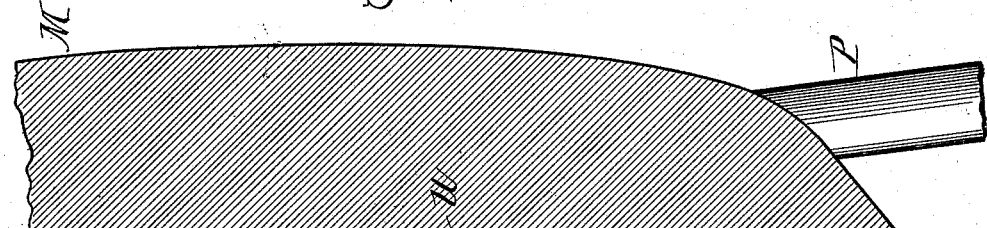
Witnesses　　　　　　　　　　　Inventor
Martin H. Olsen　　　　　　　William W. Doolittle
W. C. Coates　　　　　　　By 
　　　　　　　　　　　　　　　Attys

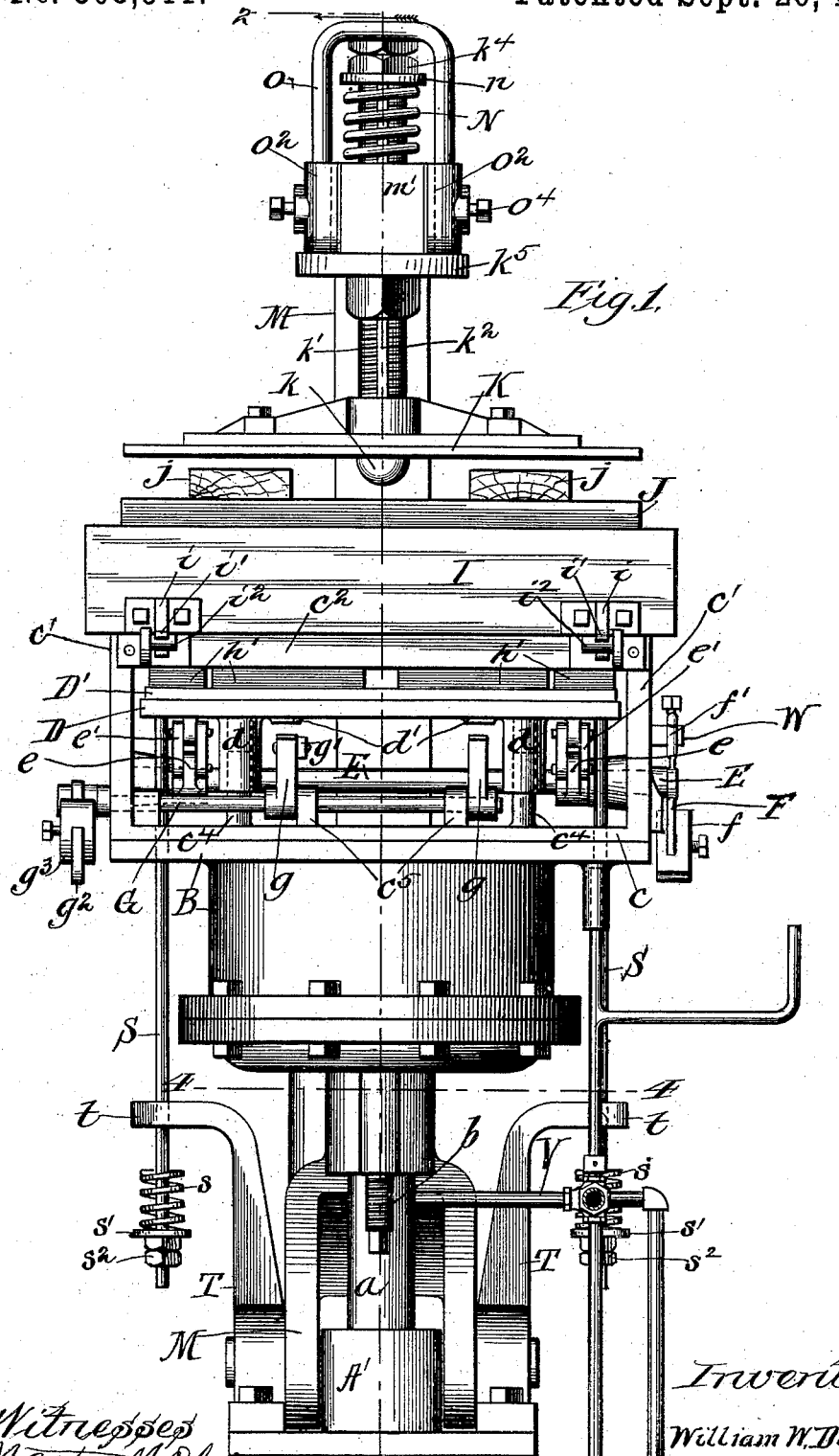

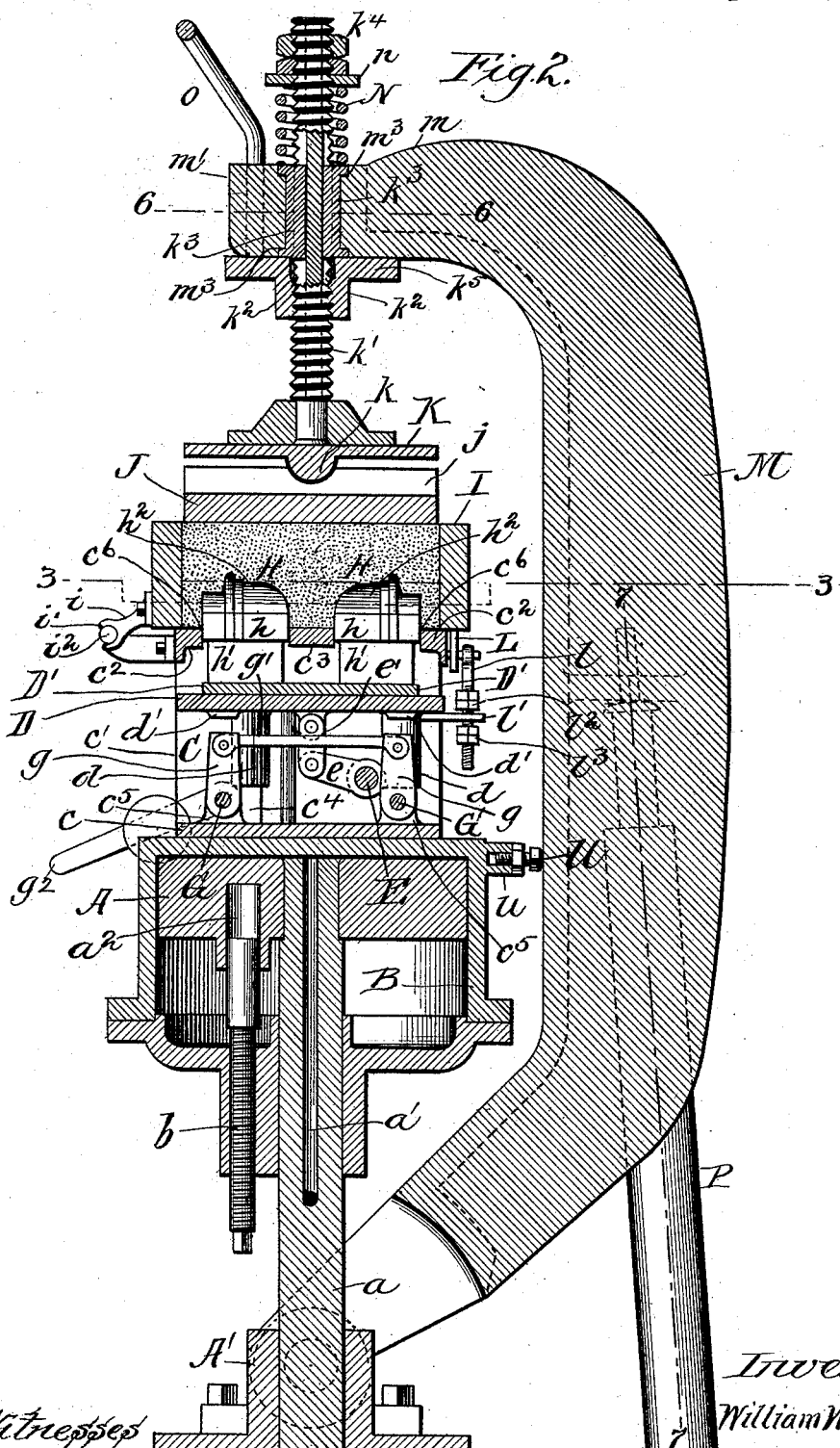

UNITED STATES PATENT OFFICE.

WILLIAM W. DOOLITTLE, OF CHICAGO, ILLINOIS, ASSIGNOR TO THE CRANE COMPANY, OF SAME PLACE.

MOLDING-MACHINE.

SPECIFICATION forming part of Letters Patent No. 505,511, dated September 26, 1893.

Application filed October 3, 1892. Serial No. 447,656. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Molding-Machines, which are fully set forth in the following specification, reference being had to the accompanying drawings, in which—

Figure 1 represents a front elevation of a molding machine; Fig. 2, a vertical section of the same taken on the line 2—2 of Fig. 1; Fig. 3, a plan section taken on the line 3—3 of Fig. 2; Fig. 4, a plan section taken on the line 4—4 of Fig. 1; Fig. 5, a rear elevation of the mold and its supports; Fig. 6, a detail plan section taken on the line 6—6 of Fig. 2; Fig. 7, a detail section taken on the line 7—7 Fig. 2; Fig. 8, a detail side elevation of the upper end of the swinging bail; Fig. 9, a detail section on the same line as Fig. 2, showing the position of the parts when compression is completed. Fig. 10, is a like view of the mold and cylinder illustrating the method of removing the mold.

My invention relates to a machine for preparing molds for casting purposes in which the sand is compressed by steam, hydraulic, or other fluid pressure; and one of the main objects of the invention is to produce a mold in which the sand is compacted with substantial uniformity throughout.

I will proceed to describe in detail the construction and operation of a machine in which I have carried out my invention in one practical way, and will then point out more definitely in claims, the particular improvements which I believe to be new, and wish to secure by Letters Patent.

In the drawings A, represents a piston which is mounted on the upper end of a rigid standard, or stem $a$, set in a suitable support A', fixed to the floor on which the machine stands. A passage $a'$, runs centrally through the upper portion of this piston stem, extending, from the upper end thereof, downward something more than half the length of the stem, to provide for the admission of water, steam or other fluid whichever is to be used for the compressing power. A hollow cylinder B, is mounted on this piston, and its stem, as seen in Fig. 2; this cylinder is free to move vertically on the piston, and, obviously, will be raised when fluid under pressure is admitted through the passage $a'$. In the bottom of the piston there is provided a recess $a^2$; and in the bottom of the cylinder is set a screw plug $b$, which passes up into the cylinder, and is arranged to enter the said recess in the piston, thus providing a stop to limit the upward movement of the cylinder, which stop is adjustable, so as to provide for the amount of movement required.

A support C, for the mold is mounted on the top of the cylinder; this support consists of a base plate $c$, which is fastened directly to the cylinder, being a little narrower than the diameter of the latter, and projecting out beyond the same, on each side of the machine, as seen in Fig. 1. At each end of this base plate rises an end piece $c'$, and the upper ends of these end pieces are joined by three horizontal bars, two of which $c^2$, are at the sides, and the other $c^3$, midway between them, leaving long longitudinal openings between the respective side-bars and the middle bar, as seen in Figs. 2 and 10. These bars may be in one piece in the shape of a plate properly slotted. The bars, or plate, are detachable from the support and make the stripping plate for the patterns. This top of the frame support C, is the direct support for the mold, the solid portions being adapted to receive the edges of the mold, and support the sand outside of the patterns, and the lateral openings being designed for the patterns themselves. The pattern table D, is arranged within the mold support below the stripping plate; this table is independent of the mold support, and is constructed to have a vertical movement therein. As shown in the drawings, this movement is provided for by means of tubular projections, or stems $d$, depending from the bottom of the table into which enter corresponding studs, or short posts $c^4$, rising from the bottom of the mold support. As shown in the drawings, the number of these posts and tubular projections is four, but any number required may be employed.

A rock shaft E is mounted in the end pieces of the support C; at each end of this shaft, a little within the end pieces of the support C, there are crank arms $e$, fixed to the shaft and connected by links $e'$, to the under side of the pattern table D, as seen in Figs. 1 and 2. The oscillation of this shaft will, obviously, raise and lower the table D, and in order to provide a certain yielding force which shall act normally to hold the table up against downward pressure, the shaft E, is projected through the end piece $c$, at one end of the mold support, and a lever F, is mounted thereon to which a counterbalance $f$, is applied; these parts being arranged relatively so that the normal action of the counterbalance is to hold up the pattern table; the counterbalance is, preferably adjustable on the lever, so as to regulate the upward pressure of the pattern table, and the lever itself is extended beyond the rock shaft opposite to the counterbalance, to provide a handle $f'$, by means of which the shaft may be oscillated by the attendant for a purpose, which will be explained presently. The pattern table D, is also provided with bosses $d'$, upon its under side, four being the number shown in the drawings, though this is merely arbitrary. Two other rock shafts G, and G', are arranged lengthwise of the mold support C, being mounted in lugs $c^5$, on the bottom part of the latter; these shafts extend respectively underneath the bosses on the under side of the pattern table, and, at points directly below the latter, are provided short arms $g$, the outer ends of which are square and adapted to form stops against which the bosses on the under side of the pattern table will strike when the stop arms are thrown up in vertical position, as shown in Figs. 2 and 9. The arms $g$, on the respective shafts, are linked in pairs by means of link rods $g'$, which run from an arm on one shaft across to the corresponding arm on the other shaft, being pivoted to each, as shown in Fig. 2 in which only one pair is linked, but both may be if desired. The shaft G, is projected out beyond the mold support at one end thereof, as seen in Figs. 1 and 3, and has fixed upon its outer end, a lever $g^2$, which is also provided with an adjustable counterbalance $g^3$; the arrangement of the parts being such that the normal effect of the counterbalance will be to hold the stop arms $g$, in vertical position, as shown in Fig. 2. The plate D', is mounted on the table D, and may be called the pattern plate. The patterns H, are mounted on this plate; these patterns consist of a rectangular, or base portion $h$, of size and shape to neatly fit one of the openings $c^6$, in the stripping plate of the mold support. From this base $h$, base blocks $h'$, depend which rest directly on the pattern plate, and constitute the support for the pattern; the pattern proper $h^2$, rises from the base. The flask I, or that part thereof which is to be filled, is mounted on top of the mold support C, being of such size as to just rest upon the outer edge of this top, but without covering the said top edges, as seen in Fig. 2 of the drawings, in which the drag of a flask is shown in position. The flask is connected to the support by a kind of open hinge joint at the front of the machine; for this purpose short arms $i$, are attached to the flask which terminate in a forked bar $i'$, adapted to take pivot pins $i^2$, on short bracket arms attached to and projecting from the front side-bar $C^2$, as seen in said Fig. 2. The flask is fitted on its support in the required position by means of a dowel-pin connection, as indicated at $i^3$, as shown in Figs. 3 and 5. The pins may be on the flask and the openings to receive them in the support, or vice versa; it is immaterial which construction is employed. A follower J, is used with the flask, and as shown, is provided with cleats $j$, on its upper side, upon which the platen K, directly bears when pressure is applied; the platen is provided with a central hemispherical boss, or lug $k$, on the under side for a purpose which will be described presently, and the cleats on the follower are for the accommodation of this projection, which stands between them, as seen in Fig. 1.

It will be seen that the flask may be tilted on its hinge connection with the support, and I have devised means whereby this movement may be started automatically. Cam levers L, are pivoted to the side bar $c^2$, opposite the flask hinge, in such position that the cam surfaces will rest against the projecting edge of the flask on this side thereof, as seen in Figs. 2 and 5. The tail ends of these levers are extended beyond the pivots, and the upper ends of rods $l$ are pivoted thereto; these rods extend downward through keepers $l'$, which are in the nature of small bracket arms, fastened and projecting from the pattern table D, and at their lower ends are threaded some distance, so as to provide for the application of nuts $l^2$ and $l^3$, the first being above and the second below the keepers, as seen in Fig. 5. The dropping of the table will, obviously, pull down the rods and operate the cam levers to tilt the flask upward, and the nuts on the rods form a means for adjusting the connection to regulate the tilting movement.

The platen is carried by the bail M, which is pivoted at its lower end to the base support A'; this bail is shaped, as seen in Fig. 2, being first extended outward from its pivot so as to clear the cylinder, and then directly upward, at one side of the parts, above described, to a point somewhat higher than the flask, when it is bent inward at about a right angle, so as to provide at its upper end an arm $m$, extending horizontally over the mold support below. The platen K, is applied to this projecting arm at the upper end of the bail; the arm $m$, terminates in a kind of square head, $m'$, provided with trunnions $m^2$, projecting at each side thereof, and a central round aperture $m^5$, passing down through it. The platen is provided with a stem $k'$, which is threaded its entire length and is passed up through the central aperture $m^5$, being of such diameter as to move freely up and down therein. The stem is also grooved lengthwise, the two grooves $k^2$, being arranged on opposite sides of the stem. Key plates $k^3$, are fitted to enter these grooves, and also similar grooves $m^3$, in the bail head, as seen in Figs. 2 and 6, thereby holding the platen stem from turning in the said head.

On the upper end of the platen stem, above the bail, there is placed a coil spring N, over which is a washer $n$, fixed in any adjusted position by jam nuts $k^4$, applied to the upper end of the platen stem. A flanged nut $k^5$, is applied to the platen stem below the bail head, and by its adjustment on the stem fixes the position of the platen with reference to the bail head, the spring above the head taking up any upward movement of the platen stem by the lowering of the flange nut thereon; at the same time, it is evident that some downward movement of the platen stem, independent of the bail, is provided for the spring yielding for this purpose. A device is provided for effecting this independent depression of the platen stem and platen. A cam plate O, is mounted on each of the trunnions $m^2$; these plates are of general rectangular shape, and are arranged to stand vertically with their edges resting on the flange of the nut $k^5$, as seen in Figs. 6 and 8. A short handle $o$, is fastened rigidly to the respective plates, so that the latter may be turned on their bearings by means of the handle. Now, when the edge $o'$, which is the shortest distance from the pivotal center of the plates, bears upon the nut flange, as seen in Fig. 8, the nut $k^5$, is at its highest point of adjustment, and rests directly under the bail head; but, if the handle $o$, is now turned down, the edge $o^2$, of the cam plates is brought to bear upon the nut, and so depresses the same, because farther away from the pivotal center of the plates than the edge $o'$; this depression, shown in Fig. 8, will, of course, depress the platen stem and platen with the nut, the spring above the bail head yielding for this purpose. The handle $o$, is made detachable by having its ends set loosely in sockets $o^3$, in the cam plates and fastened therein by means of binding screws $o^4$. The cam plates O, are provided with lugs $o^5$, at the ends opposite those to which the handle $o$, is applied; and these lugs strike lateral projections, or lugs $m^6$, on the bail arm $m$, thus stopping the farther movement of the cam plates when brought into the position, shown in Fig. 8.

A counterbalance device is provided for the bail M, which prevents it from dropping when turned back, and is designed also to hold the bail in any position to which it may be adjusted. A tubular case P, is set just back of the bail; within this case is a rod $p$, which is set in a loose plug $p'$, in the lower end of the case, and extends upward, out and beyond the upper end thereof, and is passed loosely through a lug $m^4$, at one side of the bail. A tube Q, is sleeved to the upper end of this rod below the lug on the bail; this tube is free to move on the rod, and is forced outward by a spring R, coiled around the rod within the tube, and held between the plug $p'$, and a nut $q$, turned on the lower end of the tube Q, which is threaded for this purpose; the nut also fits the tube P, and slides freely therein. The spring acts to force the sliding tube Q, up against the lug on the bail, as seen in Figs. 2 and 7, and will tend to hold the same in its elevated position seen in said figure. If the bail is turned back, obviously, the sliding tube will be forced downward, the spring yielding for this purpose, and the latter is intended to be adjusted by nut $q$ so that its power will be just about sufficient to act as a counterpoise to hold the bail stationary, whenever it is thrown back; obviously, the backward movement of the bail will be positively stopped when the sliding tube Q, is thrust entirely within the main tube P.

An auxiliary device for giving a dropping movement to the pattern table D, is shown in Fig. 1, and consists of two rods S, fastened respectively to the ends of the table, and depending therefrom through the base of the mold support and projecting face of the cylinder to keepers T, which, as shown, are in the form of brackets fastened to the base support A'; these brackets are bent outward at their upper ends to provide horizontal arms $t$, which are perforated to permit the rods to pass through them and to slide up and down therein. On the lower ends of the rods are springs $s$, which are kept in position by means of washers $s'$, below which are jam nuts $s^2$, applied to the lower ends of the rods. A stop is also provided to arrest the inward swing of the bail at the proper point, so as always to bring the platen accurately to the required position for operating upon the mold. In the drawings this is shown as a screw bolt U, which is set in a lug $u$, on the side of the cylinder next to the bail. The head of the bolt forms a solid stop to arrest the inward swing of the bail at the required point, and, as the stop is adjustable, this point may be determined with accuracy.

The operation is as follows: The flask is set on the support with the parts in position, as shown in Fig. 2 of the drawings, with the exception of the bail which, of course, is thrown back. It will be noticed that in this position, the patterns are elevated somewhat above their normal position in the flask; this distance is shown in the drawings, as about half the thickness of the base, which position is due to the elevated position of the pattern table. The flask is now filled with sand, the follower is applied, and the bail turned up so as to bring the platen in proper position over the follower. The platen being in this elevated adjustment, as seen in Fig. 2, fluid under required pressure, is now let into the cylinder through the feed pipe V, which connects with the passage in the stem of the piston. The pressure lifts the cylinder, and with it the mold support, thus bringing the sand to a compressing pressure between the mold support and the fixed platen above. As the sand above the patterns is of a much less thickness than elsewhere in the flask, it is evident that, if the patterns were held rigidly, the sand immediately above them would be compressed to a greater degree than elsewhere in the flask; but, as already explained, the pattern table will yield downward, independently of the mold support, and so during this operation of compression, the greater resistance over the patterns is transmitted through them to the pattern table, and being sufficient to overcome the counterpoise connected with this table, the latter will descend until it strikes the vertical stop arms, as seen in Fig. 9, which it is intended to do, just at the point where the upward, or compressing movement of the cylinder terminates. The position of the parts at the finish, is shown in Fig. 9, where it will be seen that the upward movement of the cylinder is stopped by the plug $b$, reaching the bottom of its socket; the pattern table has yielded, and rests upon the stop arms $g$, which stand in an upright position, and the patterns have been pressed down through the openings in the stripping plate, until the pattern bases are flush with the face of the said plate, which is the true position of the patterns for producing a proper mold, and the follower has been forced down into the flask. The descending movement of the pattern table is assisted by the rods S, and their springs, for they are adjusted so that at the latter portion of the compressing operation, the springs on said rods, will be somewhat compressed, the latter being carried upward with the general upward movement of the pattern table; the reaction of the springs will, therefore, act as an auxiliary force to lower the table, additional to the excess of pressure upon the sand over the patterns. The operation of forming the mold having been performed the fluid is allowed to escape, thus permitting the cylinder to descend, and the parts of the machine are adjusted to permit the mold to be removed and return the parts to working position. In this adjustment, the bail is turned back sufficiently far to remove the platen from working position over the flask, as seen in Fig. 10; the counterpoise lever $g^2$, is then lifted by the attendant, which throws the stop arms to one side, and slightly turned down; the supports of the pattern table being removed, the latter is caused to descend still farther by means of the handle $f'$, whereby the counterbalance $f$, is lifted and the rock shaft E, is turned to pull the pattern table downward. This movement draws the patterns downward still farther through the stripping plate and separates them from the mold. This independent lowering of the table also tilts the mold upward upon its hinges through the connection of the table with the cam levers, which are vibrated in a direction to tilt the mold upward, as seen in Fig. 10. The relative arrangement of these parts is such that the descent of the table proceeds a little way before the tilting of the mold begins, which insures a clean separation of the patterns from the mold, as they descend through the stripping plate. The mold can then be readily removed from the machine. The devices are brought into working position again by the action of the counterbalance levers F and $g^2$. The top of the mold support, which serves as a stripping plate, being removable, it may be replaced by a top with different slots, or openings, to suit different patterns.

The pressure upon the sand over the patterns may be regulated by adjusting the degree of elevation of the patterns above the stripping plate before the flask is filled. It is desirable that the pressure with which the patterns are held up in this position shall be only about sufficient to retain the patterns in this adjustment, so that the latter will readily yield when regular pressure is applied to the mold. A stop W at one end of the mold support arrests the upward movement of the handle $f'$ and thus prevents the upward projection of the patterns beyond the point desired. This stop may be made adjustable to regulate the position of the patterns, as suggested above.

The cope of the flask is formed in the same way, as described above, but the follower is not used, the platen being brought to operate directly upon the sand, so that the central projection, on the under side thereof, will form the sprue. To effect this, the platen must, of course, be lowered, and this is done by turning down the handle of the cam plates, whereby the latter are turned and the platen is depressed, as already described.

Changes may be made in some of the details of construction and arrangement of devices, and some power other than fluid pressure may be applied to effect the movement of the devices which produces the compression of the mold; therefore, I do not wish to be understood as limiting myself in all respects to the details of construction and the arrangement herein described and shown and claimed or to the employment of fluid pressure as the compressing force; any medium adapted to give the required movement to the traveling parts, may be employed.

The broad invention of uniformly compacting the sand in molds, by giving a differential movement to the mold-support and pattern-support as they are forced against the platen, is not here claimed, but constitutes the subject matter of another application, Serial No. 477,195, filed by me June 10, 1893.

Having thus described my invention, what I claim as new, and desire to secure by Letters Patent, is—

1. In a molding machine, a movable mold-support, in combination with a stationary platen, a pattern table having a movement in line with that of the mold-support but independent thereof, a stripping plate, mechanism adapted to force the mold-support toward the platen, and mechanism adapted to hold the pattern table up in working position with a yielding force, substantially as described.

2. In a molding machine, a stationary piston, in combination with a movable cylinder, a mold-support mounted thereon, a pattern table having a vertical movement independent of the mold-support, a stripping plate mechanism adapted to hold the pattern table up in working position with a yielding force, a stationary platen substantially as described.

3. In a molding machine, a stationary piston, in combination with a movable cylinder, a mold-support C mounted thereon and provided with a stripping plate top, a pattern table D mounted within the mold-support and having an independent vertical movement therein, patterns H fastened to said pattern table and adapted to move up and down in the stripping plate, and a device adapted to hold the pattern table upward with a yielding pressure, substantially as described.

4. In a molding machine, the mold-support C, surmounted by the stripping plate $c^2$, $c^3$, in combination with the pattern table D, arranged below the stripping plate rock shaft E provided with crank arms $e$, links $e'$, pivoted on the table and lever F provided with counterbalance $f$, and secured on said rock shaft substantially as described.

5. In a molding machine, a mold-support and stripping plate, in combination with a pattern table movable independently of said support, and a yielding pressure mechanism adapted to hold the pattern table and patterns toward the mold to project the patterns at first through the stripping plate beyond their normal position required in finishing the mold, substantially as described.

6. In a molding machine, a vertically movable mold support, in combination with a pattern table movable independently of the said support, mechanism for holding the pattern table toward the mold with yielding pressure, a stripping plate and removable stops adapted to arrest the movement of said table away from the mold, substantially as described.

7. In a molding machine, the mold-support C, in combination with the pattern table D having a vertical movement independent of said table, a stripping plate a yielding pressure device for holding the said table up to the mold, the stop arms $g$ mounted on rock shafts, and a device adapted to hold said stop arms in a vertical position beneath the pattern table, substantially as described.

8. In a molding machine, the mold-support C, in combination with the independently moving pattern table D, a stripping plate the rock shaft E provided with crank arms $e$, links $e'$, counterbalance lever F, rock shafts G and G', stop arms $g$ mounted thereon, the link $g'$ and counterbalance lever $g^2$, substantially as described.

9. In a molding machine, a stationary piston A provided with recess $a^2$, in combination with a movable cylinder B, adjustable plug $b$, secured in the bottom thereof mold support C, carried by said cylinder, stripping plate $c^2$, $c^3$, independently movable pattern table D, arranged below said stripping plate and a stationary platen K, substantially as described.

10. In a molding machine, a movable mold support provided with stripping plate, in combination with a separate pattern table movably supported independent of the mold-support, mechanism to hold the pattern table up to the mold with yielding pressure, movable stop arms adapted to resist the retreating movement of the pattern table under pressure at the point required for finishing the mold, means for reciprocating the mold support and mechanism for moving said stops out of working position to permit the pattern table to drop still lower, whereby the patterns may be withdrawn through the stripping plate, substantially as described.

11. In a molding machine, a reciprocating mold-support C surmounted by a stripping plate, in combination with an independent moving pattern table D, a flask I connected to the mold-support at one side by pivotal bearings, mechanism mounted on the mold support and connected to mechanism connecting said pattern table and adapted to tilt the flask by depressing the said table after finishing the mold, substantially as described.

12. In a molding machine, a movable mold-support C, in combination with a pattern table D movable independently of the mold-support, a stripping plate a flask I hinged at one side to the mold support, means for reciprocating said support the cam levers L under one edge of the flask, and the link rods $l$ connected to said levers and the pattern table, substantially as described.

13. In a molding machine, a movable mold-support C, provided with means for reciprocating it in combination with an independently movable pattern table D, a stripping plate the rods S connected to said table, keepers T through which said rods pass, and springs $s$ on the lower ends of said rods, substantially as described.

14. In a molding machine, a movable mold-support, provided with means for reciprocating it in combination with a pivoted bail M, a platen K mounted thereon, the tubular case P, rod $p$, tube Q sleeved on said rod, and spring R, substantially as described.

15. In a molding machine, the bail M provided at its outer end with a central round aperture $m^5$, and having side grooves $m^3$, in combination with a platen K provided with threaded stem $k'$, adapted to slide freely in said aperture and having side grooves $k^2$, the key plates $k^3$, the adjusting nut $k^5$, spring N, and stop $n$ on said stem substantially as described.

16. In a molding machine, the bail M, in combination with a platen K having a threaded stem $k'$ freely reciprocating in an aperture in the outer end of the bail, the flanged nut $k^5$, the retracting spring N, spring stop $n$ on said stem the cam plates O, and the handle $o'$, attached thereto, substantially as described.

WILLIAM W. DOOLITTLE.

Witnesses:
ALOYSIA HELMICH,
R. C. PAGE.